(12) United States Patent  (10) Patent No.: US 7,374,106 B1
Bromer  (45) Date of Patent: May 20, 2008

(54) TRIGGERED FLICKERING TAG

(76) Inventor: Nicholas Sheppard Bromer, 402 Stackstown Rd., Marietta, PA (US) 17547-9311

( * ) Notice: Subject to any disclaimer, the term of this patent is extended or adjusted under 35 U.S.C. 154(b) by 19 days.

(21) Appl. No.: 11/525,640

(22) Filed: Sep. 22, 2006

Related U.S. Application Data

(60) Continuation-in-part of application No. 11/143,689, filed on Jun. 2, 2005, now Pat. No. 7,232,067, which is a continuation-in-part of application No. 10/287,394, filed on Nov. 4, 2002, now Pat. No. 7,061,395, which is a division of application No. 09/987,241, filed on Nov. 14, 2001, now Pat. No. 6,476,714.

(60) Provisional application No. 60/738,368, filed on Nov. 18, 2005, provisional application No. 60/577,941, filed on Jun. 8, 2004, provisional application No. 60/290,687, filed on May 15, 2001.

(51) Int. Cl.
*G06K 19/06* (2006.01)

(52) U.S. Cl. .................... 235/492; 235/451; 340/5.2; 340/5.32

(58) Field of Classification Search ............... 235/492, 235/382, 451; 340/5.2–5.33, 5.64, 5.8
See application file for complete search history.

(56) References Cited

U.S. PATENT DOCUMENTS

| 6,564,998 | B1* | 5/2003 | Oross et al. ............... 235/382 |
| 7,025,277 | B2* | 4/2006 | Forrest et al. ............. 235/492 |
| 2004/0205350 | A1* | 10/2004 | Waterhouse et al. ........ 713/182 |
| 2004/0238625 | A1* | 12/2004 | Walker et al. ............. 235/380 |
| 2005/0077348 | A1* | 4/2005 | Hendrick ................... 235/380 |

* cited by examiner

*Primary Examiner*—Michael G. Lee
*Assistant Examiner*—Kristy A. Haupt

(57) ABSTRACT

Tags that are associated with an item such as a person or vehicle are caused to optically flicker out an identifying pattern when triggered by a user or a device at an access point (gate, computer, card reader, or the like). The association of the tag and item can include a physical attachment. The flickering light is analyzed and access is permitted if the data key encoded in the flickers is an authorizing code. A lamp such as a laser or LED is used to create the flickers.

19 Claims, 2 Drawing Sheets

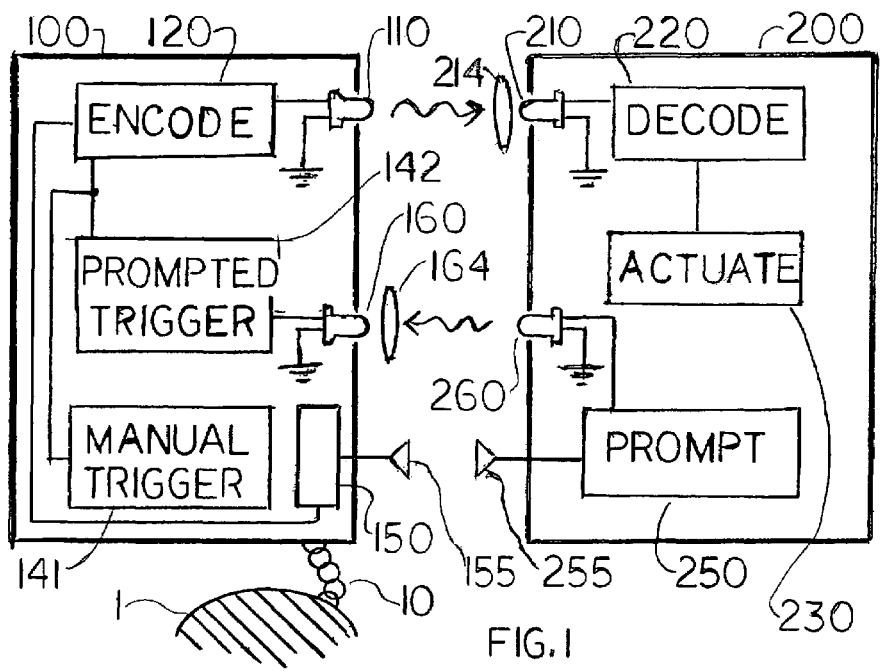
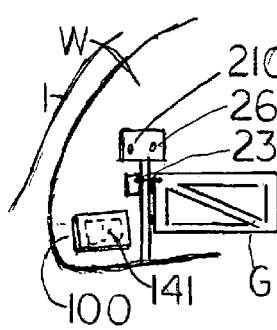
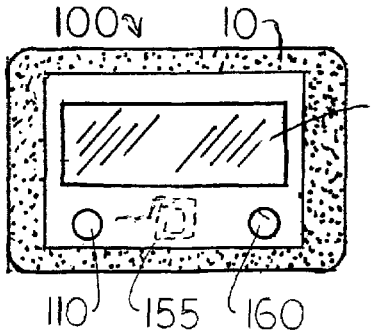
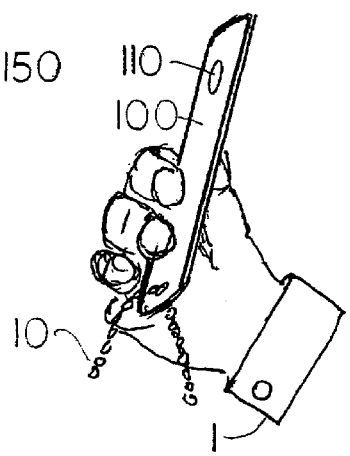

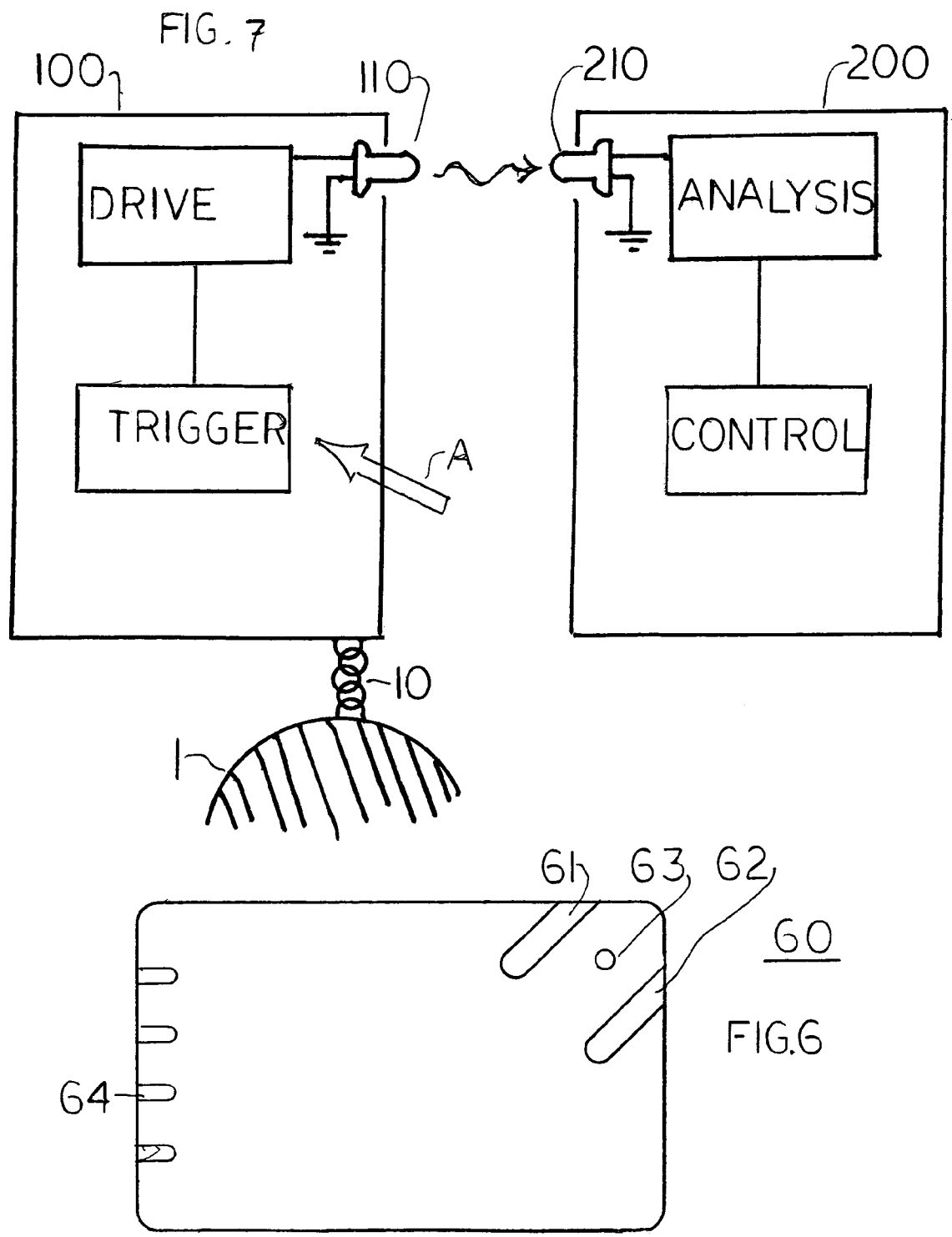

US 7,374,106 B1

TRIGGERED FLICKERING TAG

CROSS REFERENCE TO RELATED APPLICATIONS

This application is a continuation-in-part of application Ser. No. 11/143,689, by the same Applicant, entitled "Registering Multiple Similar Items With Flickers," filed Jun. 2, 2005, the entire disclosure of which is entirely incorporated herein by reference (application Ser. No. 11/143,689 issued on Jun. 19, 2007 as U.S. Pat. No. 7,232,067 B1). Application Ser. No. 11/143,689 incorporated provisional application 60/577,941, filed on Jun. 8, 2004, which is therefore incorporated into this application. Application Ser. No. 11/143,689 was a continuation-in-part of, and entirely incorporated, application Ser. No. 10/287,394, filed on Nov. 4, 2002 (now U.S. Pat. No. 7,061,395) and also Application 60/290,687 which was incorporated into application Ser. No. 10/287,394. Application Ser. No. 10/287,394 was a division of application Ser. No. 09/987,241 (now U.S. Pat. No. 6,476,714), filed by the Applicant on Nov. 14, 2001. The entire contents of application Ser. No. 09/987,241 were incorporated into application Ser. No. 10/287,394 by reference. (U.S. Pat. No. 6,476,714 was entirely incorporated by reference into provisional application 60/577,941.) The Applicant's application Ser. No. 09/987,341 claimed benefit of the filing date of Application 60/290,687, and also incorporated the whole disclosure of that provisional application 60/290,687 by reference. Therefore this application incorporates the entire disclosure of each regular application, provisional application, and patent mentioned above.

[Application 60/290,687 was filed on May 15, 2001. That provisional application was directed mostly to putting a flickering lamp next to a supply of similar items, not on the items themselves, but stated that "the flickering lamp may be attached to each item" (page 11, ¶2) and the "items" were not specified and therefore included vehicles and people. Claim 12 of application 60/290,687 recites "an item belonging to a subset of a plurality of items . . . a flickering lamp, associated with the item." The same application at the top of page 5 states as alternatives, "The lamp may be caused to . . . flicker by a stimulus, or to [flicker] continuously or continually." Thus, triggered (i.e. stimulated) flickering was disclosed in the '687 application. That same provisional application also defined "bar code" broadly (at page 11, ¶4) to include any bar-code type of encoding which uses two states (i.e., digital encoding) and is sequential, so that "bar code" does not cover just standard or particular bar codes like UPC. Thus, triggered flickering of a lamp attached to a non-specific item was disclosed in the May 15, 2001 provisional application 60/290,687.]

This application claims benefit of the filing date of provisional application 60/738,368 filed by the Applicant on Nov. 18, 2005, entitled "Triggered Flickering Tag," which also incorporated prior applications as listed above.

FIELD OF THE INVENTION

The invention relates to identifying vehicles or individuals to a device that registers and responds to the identity, especially by opening or unlocking a door, gate, program or file.

REVIEW OF THE RELATED ART

There are many situations in which a device must respond to the presence of a vehicle, a person, or other item. For example, an access gate at a military facility or a gated community should open only for specific persons or vehicles.

Technologies based recognition of a particular person by fingerprints, eye patterns, or facial features are in various stages of development and commercialization, but require sophisticated computers and software and cannot provide reliable identification at low cost. They also pose a privacy threat because they identify the individual, not a badge or tag that the individual carries.

Less often featured in science-fiction movies, but more used to control the access of persons and vehicles to secure locations, are RFID (Radio-Frequency IDentification) tags. RFID tags are not based on a particular person but instead are only associated with the person, so they pose less of a privacy threat. RFID technology is also less expensive than person-recognition technology. But RFID has certain drawbacks.

RFID tags generally have no internal power source and instead are powered by radio waves from the detector (or some other outside source). The RFID tag has an antenna which turns the radio waves into oscillating electrical voltage, and a rectifier and capacitor to store the radio-wave energy. Once the capacitor is charged, the tag circuits are powered and those circuits cause the antenna to broadcast an identification code through the same antenna that received the radio waves from the detector. All that is required to make an RFID tag radiate its coded signal is a steady, unmodulated radio frequency.

Clearly, the code from an ordinary RFID tag can be stolen with a device that emits radio waves and records the response from the tag from any nearby location. Since radio waves are invisible, such theft would not be noticed by the person wearing the RFID tag. RFID detectors are small and can be purchased by anyone.

The present inventor's U.S. Pat. No. 6,476,715 (entirely incorporated herein by reference) describes identifying a vehicle by causing lamps of the vehicle (such as an LED brake lamp) to flicker, but this patent is directed mainly to continual emission of flickers by a vehicle, that permit it to be tracked or recovered. Triggered flickering is mentioned at col. 3, line 64 of that patent, but voluntary triggering by a driver, or triggered flickering only in certain places, is not appropriate when a vehicle has been stolen.

SUMMARY OF THE INVENTION

The invention described below relates to optical flickering to identify a vehicle, person, or object, where the flickering is triggered, either manually, automatically, by proximity to a gate or door, by electrical contact, etc.

Triggered flickering is preferable for security uses, such as opening a gate to a restricted area or accessing a bank account or computer file. If a person, vehicle, or object continually radiates identifying flickers, then it will be easy for a thief or enemy to record, analyze, and mimic the identifying flicker to gain access.

Preferably, the flickering should only be triggered when needed, which usually will be in proximity to the gate, door, or device which permits access to the restricted area, or when the user decides to trigger the flicker. This invention includes manual and automatic (prompted) triggering.

The invention uses a lamp or lamps, preferably a solid-state lamp like an LED (light emitting diode) or laser, to send information by flickering the lamp light. The lamp is preferably incorporated into a tag that is attached somehow to the person, vehicle, or other item (or associated, see below). Besides the lamp, the tag may include an electronic circuit to drive the flickering, means for powering the circuit such as a battery, and the trigger, which may be a momentary-contact switch for manual triggering or an optical or radio receiver which triggers flickering on receipt of a signal.

The light emitted by the flickering lamp can be visible light, but other optical frequencies of invisible light (infrared and ultraviolet) are also useable in the invention.

The flickering preferably conveys information digitally, by turning the lamp rapidly on and off, but any type of modulation can be used also.

BRIEF DESCRIPTION OF THE DRAWING FIGURES

FIG. 1 is a schematic view of the invention.
FIG. 2 is a perspective view.
FIG. 3 is an elevational view of the tag shown in FIG. 2.
FIG. 4 is a perspective view.
FIG. 5 is a perspective view.
FIG. 6 is a plan view.
FIG. 7 is a schematic view of the invention.

DETAILED DESCRIPTION OF THE PREFERRED EMBODIMENTS

FIG. 1 shows a system for controlling access of an item 1 to a secured area. The system includes the item 1 (which can be a person, vehicle, or object) and a tag 100 which is attached to the item 1 by an attachment 10 (i.e. some means for attaching the tag to the item). The tag 100 further includes a trigger which can be either one or both of a manual trigger 141 and a prompted trigger 142, and an encoder 120 driving a solid-state lamp 110, for example, one or more ordinary LED's. The encoder 120 may further comprise a clock, counter, and memory as illustrated in FIG. 2 of U.S. Pat. No. 6,476,715 and described in that patent, but any circuitry can be used. The circuitry of a TV remote, for example, can be adapted to use in this invention. The encoder 120 drives the lamp 110 to flicker an identifying signal when triggered by the trigger 141 or 142. The term "flickering" includes any modulation of the light from the lamp 110 that carries information, but preferably the lamp 110 turns on and off rapidly).

An access control device 200 responds to the flickers when light from the lamp 110 falls onto a photodetector 210, after (optionally) passing through an optical system or device 214 (e.g., a lens) that focuses and/or treats (e.g., filters) the light. The photodetector 210 converts the item-identifying signal (the flickering light from the lamp 110) into an electrical signal, which is then decoded by an analyzing circuit 220. If the analyzing circuit recognizes from the electrical signal the flickering light as the code identifying the item, then it sends a command to an actuator or control circuit 230 that allows the item 1 access to the area, according to identity of the item.

The control circuit 230 may include a solenoid or other physical actuator that opens or unlocks a gate or a door, or, it might be a computer program or subroutine that allows access to a program or file.

(The phrase "secured area" as used here and in the claims includes not only physical areas and volumes, such as a closed room, but also an area of information, for example, areas in a computer memory. The invention can be used to control access to files, programs, and other secured areas of a computer, in place of a password. For example, it can be used to access a bank account or credit card account. Thus, this invention includes a system in which items in a store have respective LED's attached to them, with triggers to cause the LED's to flicker when a detector is proximate; each LED, when triggered, sends an optical signal to the detector and the detector in turn accesses a register of items in a computer memory (an area); such a system is described in Application 60/290,687 (noting page 11, first full paragraph), where the register is a register of items to be purchased.)

If various items 1 to be admitted to the secured area do not need to be distinguished, they can all have the same flicker pattern. Also, one flicker pattern can be used to access many different areas, analogously to a master key. If each item has a unique flicker, then each item can be admitted to any selection of secured areas independently of any other item.

Manual trigger 141 is preferably a momentary-contact electrical switch, but can be any other type of device that will cause the encoder 120 to drive the lamp 110 to flicker. The trigger 141 can include a delay circuit requiring the user to press the electrical switch over a period of time before the identifying signal is flickered, to avoid accidental triggering. The period might be about one second.

The drawing shows a preferred embodiment of the prompted trigger 142. The trigger 142 is activated by an electrical signal from a second photodetector 160 (a receiver) when light from a second solid-state lamp 260 (a transmitter) hits it. As with the lamp 210, the light may be collimated, gathered, or treated by an optical system or device 164. The signal that causes triggering is preferably encoded light, produced by the solid-state lamp 260 as is driven by a prompting signal generator 250 comprised in or associated with the access control device 200. The type of encoding can vary with complexity along with the level of security. For a parking garage, a steady blinking of the lamp 260, or a steady modulation of any sort, can be used; the frequency of the blinking or modulation, identified by the prompted trigger circuit 142, would result in a triggering signal to the encoder 120. In this case each blink is a triggering flash that actuates the drive circuit of the encoder 120 to drive the lamp 110 to flicker its identifying signal.

The triggering flash can encode information in more sophisticated ways also. The circuits of the prompting signal generator 250 can be similar to those of the encoder 120, and the circuits of the prompted trigger receiver 142 can be similar to those of the decoder 120, and then by using various encoding schemes the tag 100 can be made to trigger near a specific access control device 200, or at certain times.

Any other sort of prompting can be used that will trigger the tag 100 when it is proximate to the access control device 200, including the use of non-optical-frequency electromagnetic waves (e.g., radio waves), sound waves, magnetic triggers, mechanical switches, etc.

For low-security applications, a steady (unmodulated) radio wave transmitter in the access control device 200 can be used to power the tag 100, in the manner of RFID tags, by feeding energy to an antenna coupled to a diode and capacitor, or to some similar circuit for generating an energizing voltage in response to radio waves. In this case, the electrical energy device that powers the flickers is the antenna and associated parts, rather than a battery.

In FIG. 1, such use of radio is exemplified by transmitting antenna 255 coupled to the prompting signal generator 250 (which in this case would generate a steady radio frequency signal), with a receiving antenna 155 coupled to an electrical energy device 150. If radio waves are used, then the encoder 120 can be free-running and the presence of voltage from the electrical energy device 150 can serve as the trigger signal as well as the power for causing the lamp 110 to flicker; thus, the electrical energy device 150 would in this case also comprise the trigger (prompted trigger). (When the optical transmitter 260 and receiver 160 are used, then the electrical energy device 150 might include a battery and/or photovoltaic device to power the encoder 120 continuously, and the encoder would cause the lamp 110 to flicker only when a trigger signal from triggers 141 or 142 were present. Or, the receiver 160 can act as both power source and trigger, as the antenna 155 can.)

The radio waves can also be modulated or intermittent, as well as steady.

FIGS. 2 and 3 show a version adapted for automotive use. In FIG. 2 the tag 100 is mounted on the windshield W (or other surface) of a vehicle (item) 1, preferably on the inside surface. A central area of the tag 100 comprises the manual trigger switch 141. Through the windshield W is seen a gate G coupled to an actuator 230 in a housing with the second photodetector 160 and second solid-state lamp 260 discussed above mounted in it.

FIG. 3 shows the same version as FIG. 2 from the other side (as would be seen through the windshield W in FIG. 2). The facing surface of the tag 100 includes an area of adhesive acting as the attachment 10, lamp 110 and photodetector 160, and a photovoltaic device, comprised of the electrical energy device 150. Also shown as an option is the radio receiving antenna 155, which could be used instead of or in place of the photovoltaic device comprising in the energy device 150 (which can also include a capacitor, rechargeable and/or replaceable battery, and/or other energy components).

FIG. 4 shows a version of the tag 100 in which the lamp 110 might be triggered by pressure of the user's hand (the user is the item 1), or other means discussed above, and which uses as the attachment 10 a cord or chain, as well as the size of the tag (discussed below).

FIG. 5 shows a version of the tag 100 that might be attached to a key ring by a hole attachment 10, and has a pressure switch as the manual trigger 141. The lamp 110 is behind a lens 114 at the far end, and shines through it. This version will be rugged and might well be used to signal from a distance, especially if the lens 114 makes a narrow beam. For example, a solder could use the FIG. 5 version to identify herself or himself to comrades at a distance, and confirm that he or she was not an enemy. The light could be invisible infrared or ultraviolet. Such tags could also signal to an overhead drone detector to help in locating personnel.

In this invention, LED's can be ganged for greater light output, or to make more complex flicker patterns for greater security. For example, LED's of various colors (e.g., a red LED and a blue LED) can flicker, either in turn or by interleaved flashes, to transmit an unlock code.

Attachment

As exemplified by the discussion above, the means for attaching the tag to the item depend on the item. If the item is a person, the means for attaching can include a chain or cord about the neck of the person carrying the tag; a clip for attaching the tag to the person's clothing, accessories or luggage; the portions of the person's clothing, accessories or luggage which hold the tag as an integral, unitary, or non-removable portion thereof; or any other sort of attachment. If the tag is of such a size that it can fit into an ordinary pocket, handbag, or wallet, that size comprises a means for attachment to a person. In particular, if the tag is thin and of the size of a credit card (about 5.4 cm by 8.5 cm), that size constitutes a means for attaching the tag to a person, or, if the tag is thin and of the size of the breast pocket of a man's dress shirt (roughly, somewhat less than 11 cm by 12 cm), that size constitutes a means for attaching the tag to a person. In these cases "attachment" or "means for attaching" comprises a structure for associating the tag with a person, in particular by being adapted to fit into a wallet, which is a thing always carried. Association by proximity, as distinguished from physical attachment, is included within the scope of "attachment" in the following claims. Any tag which includes a ring, ring hole, or ring attachment able to attach the tag to a key chain constitutes a means for attaching or attachment of the tag to a person.

"Lamp" in the claims any light source including but not limited to LEDs, lasers, and other solid-state devices.

Laser Chips

Lasers built into silicon chips are expected to become inexpensive within the next few years, due to the breakthrough by Intel Corporation and UC Santa Barbara that was announced around Sep. 19, 2006. This breakthrough will make it feasible to construct flickering tags that use the new silicon lasers as lamps. For example, a credit-card type card with an embedded lasing chip could sent light signals carrying data.

If lasers are used in tags, they might fall under the safety rules governing lasers, even if their power were small. Therefore, described below is a way to remove such tags from under the laser rules, which is to make the laser light from the chip incoherent.

"Coherent" light is light in which all of the photons' waves are aligned so that the waves are in phase. This is the signature of laser light, and the property that gives laser light its peculiar properties and powers. It is also the property that makes it more dangerous than all other light.

I propose to use one or more lasers on a chip to make light, but to make the light incoherent by one of several methods, including but not limited to (1) reflecting or transmitting the light from an object that destroys the coherence, (2) staggering multiple lasers so that their light beams are not in phase, and (3) using lasers of different frequencies. These methods can also be used in combination.

Method (1) could employ an object like a diffraction grating, but with irregular spacing of the "rulings" (thin lines that scatter light). A diffraction grating, in which the rulings are evenly spaced, will deflect a laser beam and break it up into sub-beams, but in general will not destroy its coherence. However, if the spacing of the rulings is made irregular, then the portions of the light scattered by each ruling will not be in phase. These can be called "decoherence rulings." Just as in diffraction gratings, the decoherence rulings can be either reflect or transmit light, and can be used in combination (e.g., light that passed through a transmission decoherence ruling can then be reflected from a reflection decoherence ruling, which in general will result in more decoherence and scattering). Examples of decoherence rulings include a mirror or white spot with an irregular surface, and transparent materials with an irregular surface or irregular variations in index or refraction (variations in material, density, bubbles, etc.).

Method (2) relies on the fact that the coherence of one laser is not related to the coherence of another laser. If two lasers are staggered (relatively offset in the direction of their lengths), then photons from the two lasers will not be in phase (the photons within each beam will remain in phase with each other). If many lasers are so staggered, then the sum of their outputs will tend to lack coherence.

An equivalent method is to aim the light from each laser at a different mirror or white reflective spot, so that the reflections are out of phase. This might be easier than staggering the lasers themselves. This method differs from method (1) in that the reflective surfaces for different lasers are not spatially aligned.

Method (3), if used alone, might require that numerous lasers were on the chip. If two laser beams are close in frequency, they will "beat" when combined, resulting in a coherent beam that pulses in amplitude.

For one or just a few lasers, method (1) might be preferred. However, if plural lasers are used, each could have its own decoherence ruling, which could be different from those of the other lasers, or staggered relative to those of the other lasers. A decoherence ruling could be angled relative to a line of laser outputs, to increase the overall decoherence (combining methods 1 and 2).

Decoherence methods could be applied in a tag (e.g., credit card) in which the chip is aligned to the tag or card surface, thereby minimizing the tag thickness, and a decoherence ruling (or other decoherence device) is placed in the laser beam or beams to scatter the light perpendicularly, away from the surface of the tag or card.

The new "silicon photonics" technique might also make it easy and inexpensive to create non-laser lamps, in which case the decoherence described above might not be needed.

Silicon photonics will create infrared light, since visible light cannot penetrate silicon. Therefore tags based on the new techniques would probably use infrared light.

Cards

If incorporated into a bank card, credit card, or the like, the laser chip could be parallel to the outside surface, and the laser beam would proceed parallel also, and be reflected by the decoherence device through a transparent or translucent material. Other lamps, if used, might be oriented differently.

FIG. 6 shows that the card (tag) 60 can have two (or more) external metal surface contact electrodes 61, 62 so that when it is placed against a reader supplying voltage between the electrodes then the chip is powered, the lamp or lamps fire, and information from the card can be read by the reader from a light flickering area 63. Using the corner, as shown, would allow one type of reader to read cards and tags of different widths, for example, a passport as well as a credit card. The contacts 61 and 62 could be arranged on one end as well as at the corner.

The back side of the card or tag should be opaque and the reader should be designed so that light does not escape while the lamp is flickering. The reader might be black and have a well into which the card is put, for example. This will prevent others from skimming the card's data when it is used.

The user of such a card need only slap the card into the well in order to transfer the information stored in the chip. For this reason such a card or tag could be called a "slap card" or "tap card" or something similar. If the tag or card had a power source such as a battery, solar cell, or radio-energy pickup, then the card could be fitted with a switch, for example a pressure switch, to transmit the light. This would allow the card or tag to be used with a remote detector as well as with an electrical-contact reader (similarly to the tag of FIG. 4). The external electrodes could also be used to trigger light transmission, for example, by completing a circuit within the card rather than by supplying the power.

The tag described above could also be used to output data, as well as retrieve data. For example, a personal card could both identify the person carrying it and also output information, such as medical records, to the same reader. Such data could be input and updated through additional contacts 64.

Such a card (and the other embodiments) can be applied to double access points, for example, a subway or parking garage in which both entry and egress are logged, perhaps at different points; in such applications data on a card is often modified (but it need not be, as for example if a subway rider's entries and exits are logged just by his or her identity, and then the rider's credit card is automatically billed). Besides the contacts 64, data could be input optically if the card incorporated a photocell and stored in internal memory.

ANOTHER EMBODIMENT

FIG. 7 shows a simplified version of the system of FIG. 1. The system includes the item 1 as in FIG. 1 and a tag 100 which is attached to the item 1 by an attachment 10 (i.e. some means for attaching the tag to the item). The tag 100 includes a trigger and a driver driving a solid-state lamp 110. The driver may further comprise a clock, counter, and memory as illustrated in FIG. 2 of U.S. Pat. No. 6,476,715 and described in that patent, but any circuitry can be used. The lamp 110 flickers an identifying signal shown by the wavy arrow.

An access control device 200 responds to the flickers when light from the lamp 110 falls onto a photodetector 210 that converts the flickering light from the lamp 110 into an electrical signal, which is then decoded by an analysis circuit. If the analysis circuit recognizes from the electrical signal a the code identifying the item, then it sends a command to a control circuit that allows the item 1 access to the area, according to identity of the item.

The double-sided arrow A in FIG. 6 that points to the trigger indicates a triggering action, either from a user (not shown in FIG. 6, see FIG. 4) or from the access control device 200.

I claim:

1. A system for controlling access of items to a secured area, the system comprising:
   (a) an access control device;
   (b) for each item to have access, a respective tag attachable to the item; the tag further comprising:
   a lamp to emit light;
   a drive circuit, coupled to the lamp, to drive the lamp to flicker an item-identifying signal when triggered; and
   a trigger to actuate the drive circuit to drive the lamp to flicker, the trigger comprising a first pair of electrodes to make electrical contact between the tag and the access control device, wherein the contact actuates the drive circuit; and
   (c) an attachment for attaching the tag to the item;
   wherein the access control device further comprises a second pair of electrodes, a photodetector converting the identifying signal into an electrical signal, an analyzing circuit identifying the item from the electrical signal, and a control circuit allowing access to the area according to the identity of the item.

2. The system according to claim 1, wherein the trigger comprises a manually-operable electrical switch and a delay requiring pressing of the electrical switch over a period of at least about one second before the identifying signal is flickered.

3. The system according to claim 1, wherein the tag comprises an electrical energy device selected from the group consisting of a rechargeable battery, a capacitor, a photovoltaic device, and an antenna.

4. The system according to claim 1, wherein the flickered identifying signal comprises visible light.

5. The system according to claim 1, wherein the electrical contact supplies electrical energy to the tag.

6. The system according to claim 1, wherein the tag is a monetary-access card.

7. The system according to claim 6, wherein the tag is a credit card.

8. The system according to claim 1, wherein the attachment constitutes a means for attaching.

9. The system according to claim 1, wherein the attachment comprises associating the item and the tag.

10. The system according to claim 1, wherein the item is a person.

11. The system according to claim 1, wherein the identifying signal is unique to the item.

12. The system according to claim 1, wherein the electrical contact actuates the drive circuit by completing a circuit between the tag and the access control device, without supplying electrical power to the card.

13. The system according to claim 1, wherein the electrical contact actuates the drive circuit by supplying electrical power to the tag.

14. A system for controlling access of items to a secured area, the system comprising:
   (a) for each item to have access, a respective tag attachable to the item; the tag further comprising:
   a lamp to emit light;
   a drive circuit, coupled to the lamp, to drive the lamp to flicker an item-identifying signal when triggered; and
   a trigger to actuate the drive circuit to drive the lamp to flicker;
   (b) an attachment for attaching the tag to the item; and
   (c) an access control device further comprising a photodetector converting the identifying signal into an electrical signal, an analyzing circuit identifying the item from the electrical signal, and a control circuit allowing access to the area according to the identity of the item;
   wherein the access control device includes a transmitter to send encoded information to the tag and the trigger of the tag comprises a receiver responding to a signal from the transmitter, and wherein the signal from the transmitter causes the drive circuit to drive the lamp to flicker an identifying signal.

15. The system according to claim 14, wherein the transmitter includes a second solid-state lamp, the signal comprises a triggering flash, and the receiver comprises a second photodetector responding to the triggering flash to actuate the drive circuit to drive the lamp to flicker an identifying signal, and wherein the triggering flash encodes information.

16. In combination,
   a card comprising a flickering lamp and
   a reader including a trigger to cause the card to send information to the reader by flickering light;
   wherein the card and the reader each comprise a respective pair of electrodes and the reader includes an alignment structure to align the card to the reader such that when aligned to the reader the card is electrically triggered to flicker by electrical contact of the electrodes.

17. The combination according to claim 16, wherein the electrodes of the reader actuate the drive circuit by supplying electrical power to the tag.

18. The combination according to claim 16, wherein the card is a credit-card-sized card.

19. The combination according to claim 16, wherein the electrical contact completes a circuit between the card and the reader without supplying electrical power to the card.

* * * * *